United States Patent

Colardelle et al.

[15] 3,689,710

[45] Sept. 5, 1972

[54] TWO-WIRE TO FOUR-WIRE CONVERSION CIRCUIT FOR A DATA SWITCHING CENTER

[72] Inventors: Joel Serge Colardelle, Creteil; Pierre Girard, Paris; Claude Paul Henri Lenouge, Maurepas, all of France

[73] Assignee: International Standard Electric Corporation, New York, N.Y.

[22] Filed: Oct. 12, 1970

[21] Appl. No.: 79,777

[30] Foreign Application Priority Data

Oct. 17, 1969 France....................6935622

[52] U.S. Cl...........................179/170 D, 179/170 T

[51] Int. Cl...........................................H04b 1/58

[58] Field of Search...179/81 A, 170 D, 170 NC, 170 T, 179/170.2; 330/188, 30 R; 333/11, 25

[56] References Cited

UNITED STATES PATENTS

| | | | |
|---|---|---|---|
| 2,810,081 | 10/1957 | Elliott | 179/170 T |
| 3,540,049 | 11/1970 | Gaunt | 179/170 NC |
| 3,108,157 | 10/1963 | Feiner | 333/11 |
| 2,733,304 | 1/1956 | Koenig | 179/170 T |

FOREIGN PATENTS OR APPLICATIONS

| | | | |
|---|---|---|---|
| 214,818 | 5/1958 | Australia | 179/170 T |

*Primary Examiner*—Kathleen H. Claffy
*Assistant Examiner*—William A. Halvestine
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

In a two-wire to four-wire data switching center, the usual hybrid transformer(s) is replaced by a single transformer with a symmetrical secondary. Interaction between both directions of transmission is avoided by connecting the extremities of the secondary respectively to the output of a first current amplifier and to the input of a second current amplifier. This circuit is intended specifically for use with electronic switching such as that using MOS switching crosspoints and stages.

2 Claims, 4 Drawing Figures

Inventor
J. S. COLARDELLE - P. GIRARD -
C. P. H. LEROUGE
By D. B. Warner
Attorney

TWO-WIRE TO FOUR-WIRE CONVERSION CIRCUIT FOR A DATA SWITCHING CENTER

The present invention concerns a two-wire to four-wire conversion circuit for coupling two-wire lines to a four-wire data switching network.

It is known that transmission between subscribers (or concentrators) and a data switching center, such as a telephone central exchange, is carried out generally over two-wire lines in order to save copper.

It is known also that if the switching in the central exchange involves the use of electronic crosspoints, it is generally necessary that the two transmission directions be separated, so that four-wire circuits are needed. Four-wire switching networks have been described in the following French patent application:

a. PCM Network: Patent Application Ser. No. 6,901,888 filed on Jan. 30, 1969.

b. Amplitude modulation network: Patent Application PV 156 405 filed on June 25, 1968.

In the prior art, two-wire to four-wire conversion has been carried out by means of bridge circuits in the form of hybrid transformers. Such conversion circuits use one or two transformers of hybrid type which must be of high quality and the balancing of the various impedances of the bridge must be very accurate in order to minimize the interaction between the two directions of transmission and the insertion loss.

In the present invention, two-wire to four-wire conversion is carried out by means of a transformer, the primary winding of which is connected to the line and the secondary winding of which is constituted by a center-tapped winding. One of the ends of the secondary winding is connected to the input of a current amplifier and the other end to the output of an amplifier of the same type. It will be remembered that an ideal current amplifier presents zero input impedance and an infinite output impedance. Such an ideal current transformer will be realized, to a fair approximation, by a bipolar transistor in common base configuration which presents a current gain slightly lower than unity. The circuit according to the invention enables the elimination of high accuracy balancing resistors and the use of current amplifiers enables the elimination of insertion losses due to the transforemers and to the switching network, even if this latter presents an appreciable resistance. This is the case when the crosspoints are achieved by means of MOS transistors such as those described in the patent application referenced b).

The object of the present invention is thus to design a two-wire to four-wire connection circuit for coupling two-wire transmission lines to a four-wire data switching network.

According to the invention there are provided means associated with each line including a transformer with a center tapped symmetrical secondary winding whose tap is grounded through a resistor R1. Means are provided for connecting one end of the secondary to the input of a first current amplifier and the other end of said winding to the output of a second current amplifier. Means are provided for connecting the output of the first amplifier to a receiver. Means are provided for injecting into the input of the second amplifier a current proportional to the voltage supplied by a transmitter so that the energy received over the line is distributed between the receiver and the resistor R1 and the energy transmitted by the transmitter is distributed between the line and the resistor R1.

According to another characteristic of the invention there are provided means located in a junctor for connecting the output of the first amplifier of a given line to the input of a second amplifier of another line said means comprising, in particular, an amplifier connected to the output of the first amplifier which delivers a voltage the amplitude of which may be chosen in such a way as to cancel the insertion loss of the conversion circuits and of the switching network.

The above mentioned and other features and objects of this invention will become apparent by reference to the following description taken in conjunction with the accompanying drawings in which:

FIG. 1 represents the principal diagram of the circuit according to the invention for optimizing the adaptation of a two-wire line L of impedance ZL to a transmitter and to a receiver of impedances ZK and ZR. It comprises:

Figure 1:
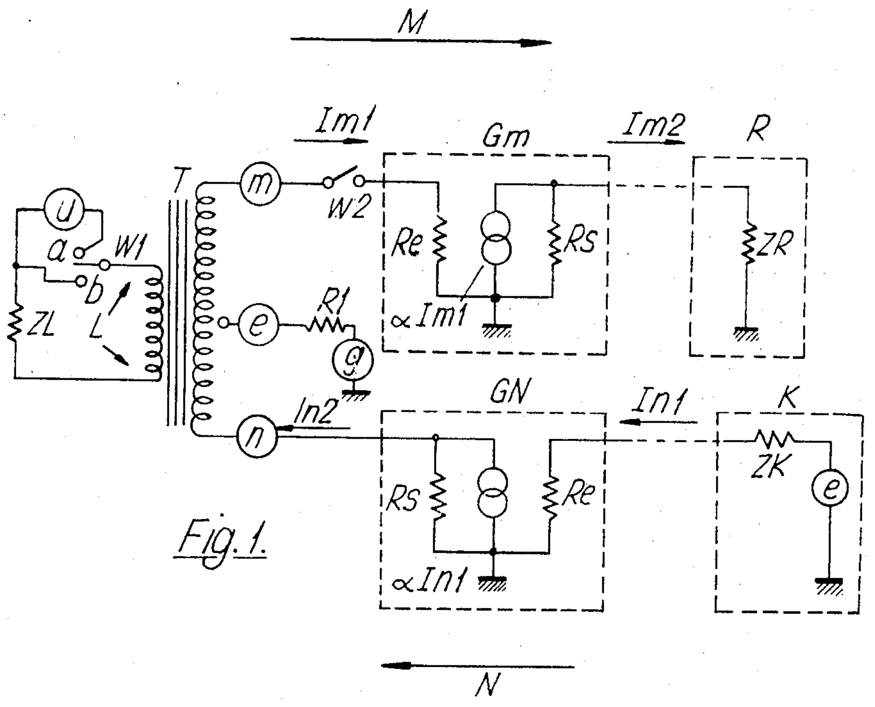
FIG. 1 represents the principal diagram of the two-wire to four-wire conversion circuit according to the invention.

- the symmetrical transformer T comprising a primary winding with *p* turns and a center-tapped secondary winding with 2*p* turns, this tap being grounded through the resistor R1. Each one of the extremities m and n of this winding constitutes, together with the common ground connection, a two-wire line for unidirectional data transmission;
- the current amplifiers G*m* and G*n* of very low input impedance Re which deliver a constant current of amplitude $I2 = \alpha I1$, if one designates by I1 and I2 the input and output currents and by $\alpha$ the current gain. These amplifiers present an output impedance R*s* which is very high.
- The receiver R and the transmitter K are symbolically shown, respectively, by an impedance Z*r* and a voltage source e of internal impedance ZK. These impedances ZR and ZK are chosen such as they are very high with respect to Re and very low with respect to R*s*.

It will now be shown that this circuit assures the two-wire to four-wire conversion, i.e.

- The energy sent by the transmitter K is transmitted only towards the line L (transmission direction N);
- The energy received over the line L is transmitted only towards the receiver R (transmission direction M).

1. ENERGY SENT BY THE TRANSMITTER K

It will be assumed that the inverter W1 is in position b and that the switch W2 located over the wire m is open. The current In1 delivered by the transmitter K is injected in the amplifier Gn and its value is:

$$In1 = (e/ZK + Re) \cong e/ZK$$

This amplifier supplies a current $In2 = \alpha In1$ which is injected in the circuit constituted by the series connection of the resistor R1 and by one half of the secondary winding of the transformer T in which is reflected the impedance ZL of the line. The potential difference $Vn - Vg$ between the extremity of the transformer and the ground is thus : $Vn - Vg = (R1 + ZL) \cdot In2$. If one sets : $R1 = ZL = ZK$, it is seen that the energy is distributed equally between $ZL$ and $R1$, and one has :

$$Ve - Vg = R1 \cdot In2 = +u' = (\alpha e \quad (1)$$

$$Vn - Ve = +u'$$

The equation (1) gives the value of the voltage $u'$ across the terminals of the primary transformer. Besides, the secondary of the transformer constitutes an auto-transformer, and :

$$Vm - Ve = Ve - Vn = -u'.$$

From these equations, one may write :

$$(Ve - Vg) + (Vm - Ve) = Vm - Vg = +u' - u' = 0.$$

It is seen that there is a zero potential difference between the points $m$ and $g$, i.e. that the end $m$ of the transformer is at the ground potential. If the switch W2 is closed, one has $Im1 = 0$ since one is connected to the input of the amplifier $Gm$ which is itself grounded through the resistor R$e$. *It is seen then that the energy sent in the direction N, from the transmitter towards the line is equally shared between the line L and the resistor R1 and that no energy at all is directed toward the receiver R, this being true regardless of the value of ZK.*

2. ENERGY RECEIVED OVER THE LINE L

One may consider that this energy is supplied by a voltage source $u$ (inverter W1 in the position $a$) of internal impedance ZL. This voltage $u$ produces two voltages which are equal and of opposite signs in the two halves of the secondary winding.

The equivalent circuit of the extremity $n$ comprises thus a voltage source $u$ of internal impedance $ZL + R1$ which is loaded by the resistor R$s$, the value of which is practically infinite. Almost the totality of the voltage u appears thus across the terminals of R$s$ but since, in practice, each one of the current amplifiers G$m$ and G$n$ is materialised by a bipolar transistor in common base configuration which presents a very low reverse voltage transfer ratio (about $5.10^{116\ 4}$), no signal at all appears practically at the output of the amplifier G$n$.

The equivalent circuit of the extremity m comprises a voltage source $u$ of internal impedance $ZL = R1$ which is loaded by a very low resistor R$e$, so that one has:

$$Im1 = (u/ZL + R1) \qquad Im2 = (\alpha u/ZL + R1)$$

If $ZL = R1$, it is seen that half of the energy transmitted in the direction M (from line receiver) is dissipated in the resistor R1.

Last, one has :

$$Im2 = \alpha u/2R1 \quad (2)$$

Figure 2:
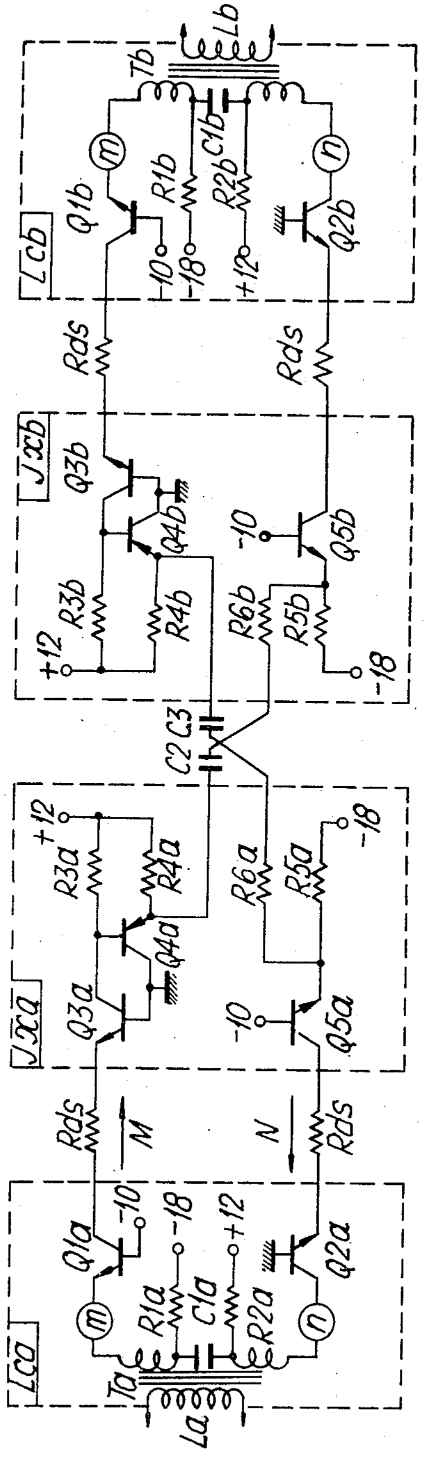
FIG. 2 represents the detailed diagram of a four-wire path through which a link is set up between lines L*a* and L*b*.

FIG. 2 represents the detailed diagram of the four-wire path through which the link is set up between the lines L$a$ and L$b$ through a junctor J$x$. The path between a line and the junctor comprises:

The line circuit LC$a$ (or LC$b$) ;

The part J$xa$ (or J$xb$) of the junctor J$x$ ;

The capacitors C2 and C3 which assure DC level isolation between the parts J$xa$ and J$xb$ of the junctor ;

The resistors Rds interposed over the wires of each one of the transmission directions M and N which symbolize the path set up by means of MOS transistors, this network being that described in the patent application referenced $b$. Each one of these resistors R$ds$ represents the sum of the drain-source resistances of the MOS transistors located over the path, and one may set $Rds < 600$ ohms. It will be noted that this value may vary according to the individual characteristics of the MOS transistors.

A line circuit, such as LC$a$, comprises the transformer Ta identical to the transformer T of FIG. 1, the resistors R1$a$, R1$b$ such as $R1a = R1b = 2R1$, and the bipolar NPN transistors Q1$a$, Q1$b$ in common base configuration which materialize, as has been seen hereabove, the current amplifiers G$m$ and G$n$.

The part J$xa$ (or J$xb$) of a junctor comprises :

For the transmission direction M : the complementary bipolar transistors Q3$a$, Q4$a$ and the resistors R3$a$, R4$a$ ;

For the transmission direction N : the NPN transistor Q5$a$ and the resistors R5$a$, R6$a$.

Figure 3:
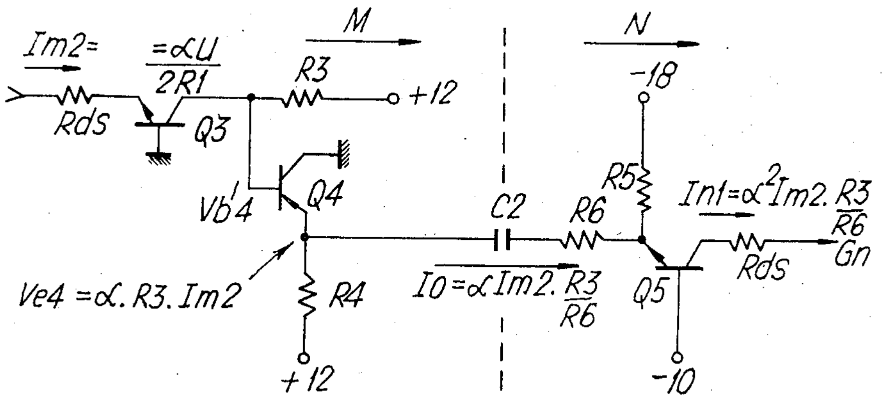
FIG. 3 represents the unfolded diagram of a junctor.

One will now study the transmission of energy from the line L$a$ towards the line L$b$ using the diagram of FIG. 3 which also may be considered as an "unfolded" representation of the circuits of one of the parts J$xa$ or J$xb$ of the junctor J$x$.

If one considers a link set up between the lines L$a$ and L$b$ (FIG. 2), the path used for each one of the transmission directions uses the circuits represented on this Figure. In order to simplify the Figure and the description, the letters "$a$" and "$b$" associated with the transistors have been omitted.

This junctor J$x$ receives, in the transmission direction M, a current I$m$2. If one assumes that all the transistors represented on the Figure are biased in Class A, one may write, for the small signals analysis:

V$b$4 : base voltage of the transistor Q4

V$e$4 : emitter voltage of this transistor.

one has : $Vb4 = Ve4 = \alpha R3 \cdot Im2$. This voltage is applied to the transistor Q5 through an impedance R6 providing a current : $Io = Ve4/R6 = \alpha \cdot R3/R6 \cdot Im2$. The collector current of this transistor is $In1 = \alpha \cdot Io = \alpha^2 \cdot R3/R6 \cdot Im2$.

It is injected in the base of the transistor Q2, the collector current of which is $$In2 = \alpha^3 \cdot R3/R6 \cdot Im2 \quad (3)$$

As it has been seen during the study of FIG. 1, the voltage applied to the primary of the transformer T is $$u = (2R1.Im2/\alpha \quad (2)$$

and the voltage collected on the primary of the transformer is:

$$u' = R1 \cdot In2 \quad (1)$$

By replacing $In2$ and $Im2$ in the equation (3) by their values given in these equations (1) and (2), one obtains:

$$u'u = \alpha^4 \cdot R3/2R6 \quad (4)$$

It is seen then that the transmission loss is independant of the value of the resistances R$ds$. It has also been seen, during the study of FIG. 1, that the incoming lines (L$a$) and the outgoing lines (L$b$) were loaded by the same impedance $R1 = ZL$ so that the ratio between the input and output powers is equal to the square of the voltage ratio given by the equation (4).

It will be noted that one may obtain a zero transmission loss in the switching network of FIG. 2 by choosing : $\alpha^4 \cdot R3/2R6 = 1$.

The DC operation of these circuits will be now studied by using the values of supply voltages indicated in FIG. 2 and by setting, for reasons of simplification :

$R1a = R1b = R2 = R3 = R4 = R5 = 1{,}200$ ohms, $R6 = 600$ ohms,

The voltage base-emitter drop of a bipolar transistor is of 1 volt,

One will neglect $\alpha$, which has a value of about 1.

1. Direction of Transmission M.

The emitter current of Q1 is : $IE1 = (7/1{,}2) = 5{,}8$ mA.

The collector voltage of Q3 is $VC3 = 12-(5{,}8+1{,}2) = 5$ v.

The emitter voltage of Q4 is thus $VE4 = 6$ v, and its emitter current is $IE4 = (6/1{,}2) = 5$ mA. These values VE and IE4 determine the point of static operation of the transistor.

2. Direction of Transmission N

The emitter current of Q5 is $IE5 = (7/1{,}2) = 5{,}8$ mA. The emitter and collector currents of Q2 have the same value. It is thus seen that all the transistors in common base configuration are biased at 5,8 mA so that they operate as Class A linear amplifiers for signals having a peak to peak amplitude which ranges between 0 and 10 mA.

We shall now study the dynamic operation, for large signals, of the common collector stage comprising the transistor Q4.

Figure 4:
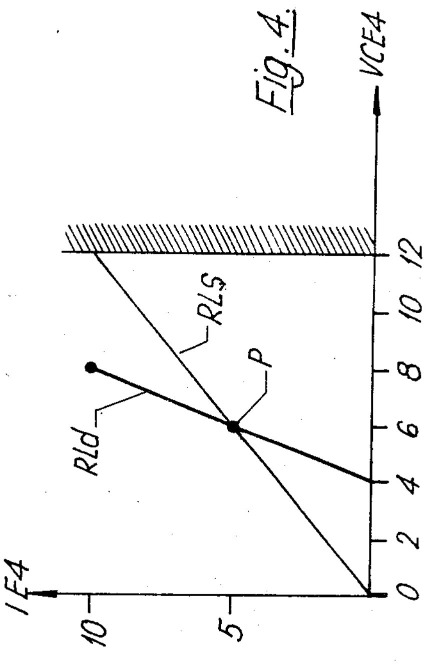
FIG. 4 represents the characteristic IE4 = *f*(VCE4) of the transistor Q4.

FIG. 4 represents the diagram $IE4 = f(VCE4)$, $VCE4$ being the collector-emitter voltage of this stage, the static load resistance of which (in DC) has a value $RLs = R4 = 1{,}200$ ohms. The operation point P has the coordinates 6 v, 5 mA as it has been seen hereabove. The dynamic load RL$d$ is constituted by the parallel connection of the resistors R4 and R6, vizus $RLd \cong 400$ ohms. It is seen on this FIG. 4 that the dynamic range of the stage is 10 mA peak to peak, in the common base stages.

The dynamic range for large signals in the path connecting the lines La and L$b$ is thus of 10 mA, vizus 6 volts peak to peak for $R1 = SL = 600$ ohms.

While the principles of the above invention have been described in connection with specific embodiments and particular modifications thereof, it is to be clearly understood that this description is made by way of example and not as a limitation of the scope of the invention.

We claim:

1. A two-wire to four-wire conversion circuit for coupling a two-wire data transmission line to a receiver and to a transmitter while providing electrical isolation between these two elements regardless of the values of their impedances comprising a transformer having a primary winding with $p$ turns connected to a line of impedance (ZL) and a symmetrical center tapped secondary winding with $2p$ turns, means connecting the center tap to ground through a resistor (R1), a first amplifier having an input which is connected to a first terminal of the secondary and an output connected to a receiver of internal impedance (ZR), a second amplifier having an input which is connected to a transmitter (K) and an output connected to the second terminal of the secondary winding, said transmitter including an internal impedance (ZK) coupled to a voltage source $e$, said first and second amplifiers each including current amplifiers of gain $\alpha$ where the gain is less than unity and the amplifiers have a low input impedance Re relative to output impedances (RS), each of said current amplifiers being formed to include a transistor in common base configuration, whereby an A.C. voltage $u$ applied to the primary of the transformer produces, at the output of the first amplifier a current $IM2 = (\alpha u/2R1)$ while no energy at all is dissipated in the impedance (ZK), and a voltage $e$ applied to the second amplifier through the impedance (ZK) produces an input current $In1 = e/R1$ (where $ZK = R1$) and produces across the primary of the transformer a voltage $u' = R1 \cdot In2 = \alpha e$ while no energy at all is dissipated in the impedance ZR, these values of ($Im2$) and $u'$ being given for the case where $R1 = ZL = ZR$ and the current ($In2$) is the output current of the second amplifier.

2. A two-wire to four-wire conversion circuit for coupling a two-wire data transmission line to a four-wire junctor while providing electrical isolation between signals transmitted in opposite directions in the four-wire junctor regardless of the values of impedances in the circuit, comprising a transformer having a primary winding with $p$ turns connected to a line of impedance (ZL) and a symmetrical center tapped secondary winding with $2p$ turns, means connecting the center tap to ground through a resistor (R1) thereby representing the connection to ground of two wires of said four-wire junctor, a first amplifier having an input which is connected to a first terminal of the secondary and an output connected to a third wire of the four-wire junctor, said third wire having an impedance (ZR), a second amplifier having an input which is connected to a fourth wire of said 4-wire junctor and an output connected to the second terminal of the secondary winding, said fourth wire including an impedance (ZK) coupled to a voltage source e, said first and second amplifiers each including current amplifiers of gain $\alpha$ where the gain is less than unity and the amplifiers have low input impedances (R$e$) relative to output impedances (RS), each of said current amplifiers being formed to include a transistor in common base configuration, whereby an A.C. voltage $u$ applied to the primary of the transformer produces, at the output of the first amplifier a current $Im2 = (\alpha u/2R1)$ while no energy at all is dissipated in the impedance (ZK), and a voltage $e$ applied to the second amplifier through the impedance (ZK) produces an input current $In1 = e/R1$ (where $ZK = R1$) and produces across the primary of the transformer a voltage $u' = R1 \cdot In2 = \alpha e$ while no energy at all is dissipated in the impedance ZR, these values of ($Im2$) and $u'$ being given for the case where $R1 = ZLxZR$ and the current ($In2$) is the output current of the second amplifier.

* * * * *